US009955059B2

United States Patent
Komaki

(10) Patent No.: US 9,955,059 B2
(45) Date of Patent: Apr. 24, 2018

(54) ELECTRONIC DEVICE, METHOD, AND COMPUTER PROGRAM PRODUCT

(71) Applicant: KABUSHIKI KAISHA TOSHIBA, Minato-ku, Tokyo (JP)

(72) Inventor: Hiroaki Komaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 309 days.

(21) Appl. No.: 14/736,650

(22) Filed: Jun. 11, 2015

(65) Prior Publication Data

US 2016/0127632 A1    May 5, 2016

Related U.S. Application Data

(60) Provisional application No. 62/072,307, filed on Oct. 29, 2014.

(51) Int. Cl.
*H04N 5/232* (2006.01)
*H04N 7/18* (2006.01)

(52) U.S. Cl.
CPC ..... *H04N 5/23203* (2013.01); *H04N 5/23293* (2013.01); *H04N 7/183* (2013.01)

(58) Field of Classification Search
None
See application file for complete search history.

(56) References Cited

U.S. PATENT DOCUMENTS

| 6,941,248 | B2 | 9/2005 | Friedrich et al. | |
|---|---|---|---|---|
| 8,373,618 | B2 | 2/2013 | Friedrich et al. | |
| 9,128,520 | B2 * | 9/2015 | Geisner | G06F 3/011 |
| 9,280,776 | B2 * | 3/2016 | Wiswell | G06F 17/30867 |
| 9,324,229 | B2 * | 4/2016 | Baillot | G08B 13/19621 |
| 9,460,340 | B2 * | 10/2016 | Kauffmann | G06K 9/00362 |
| 9,582,681 | B2 * | 2/2017 | Mishra | G06F 21/6245 |
| 2002/0046368 | A1 | 4/2002 | Friedrich et al. | |
| 2002/0067372 | A1 | 6/2002 | Friedrich et al. | |
| 2002/0069072 | A1 | 6/2002 | Friedrich et al. | |
| 2003/0200058 | A1 | 10/2003 | Ogawa et al. | |

(Continued)

FOREIGN PATENT DOCUMENTS

| JP | 2002-538541 A | 11/2002 |
|---|---|---|
| JP | 2003-308117 A | 10/2003 |

(Continued)

*Primary Examiner* — Mohammad J Rahman

(74) *Attorney, Agent, or Firm* — Knobbe, Martens, Olson & Bear, LLP

(57) ABSTRACT

Examples of an electronic device according to an embodiment include an electronic device in which user can see through at least a transparent part of a first display area when the electronic device is worn on a body of the user. The electronic device includes: a processor configured to transmit a first part included in a first position on an image imaged by the camera and first information regarding the first part and receive second information relating to processing result on the first part after a first term has passed since transmission of the first information; and display circuitry configured to display the second information at a third position on the first display area, the third position determined according to a second position in the first part on an image imaged by the camera after the first term has passed since transmission of the first information.

12 Claims, 2 Drawing Sheets

(56) References Cited

U.S. PATENT DOCUMENTS

| | | | |
|---|---|---|---|
| 2010/0141772 A1* | 6/2010 | Inaguma | G01S 3/7864 348/169 |
| 2014/0109231 A1 | 4/2014 | Takaoka | |
| 2014/0168056 A1* | 6/2014 | Swaminathan | G06K 9/00604 345/156 |
| 2014/0187213 A1* | 7/2014 | Shuster | H04W 4/023 455/414.1 |
| 2014/0222462 A1* | 8/2014 | Shakil | G06Q 10/0631 705/3 |
| 2014/0362255 A1* | 12/2014 | Kuang | H04N 5/23293 348/231.5 |
| 2015/0077548 A1* | 3/2015 | Meredith | H04N 7/183 348/143 |
| 2015/0084859 A1* | 3/2015 | Itzhaik | G06F 3/017 345/156 |
| 2015/0293738 A1* | 10/2015 | Lee | G06F 1/163 345/173 |
| 2015/0296186 A1* | 10/2015 | Renkis | H04N 7/181 348/159 |
| 2015/0356345 A1* | 12/2015 | Velozo | G06K 9/00228 382/103 |
| 2015/0356746 A1* | 12/2015 | Velozo | G06K 9/00771 382/103 |
| 2016/0054795 A1* | 2/2016 | Sasaki | G06F 3/013 345/642 |
| 2016/0335686 A1* | 11/2016 | AthuluruTlrumala | G06Q 30/0613 |

FOREIGN PATENT DOCUMENTS

| | | |
|---|---|---|
| JP | 2008-171086 A | 7/2008 |
| JP | 2014-071614 A | 4/2014 |
| JP | 2014-078910 A | 5/2014 |

* cited by examiner

ELECTRONIC DEVICE, METHOD, AND COMPUTER PROGRAM PRODUCT

CROSS-REFERENCE TO RELATED APPLICATIONS

This application claims the benefit of U.S. Provisional Patent Application No. 62/072,307, filed Oct. 29, 2014, the entire contents of which are incorporated herein by reference.

FIELD

The embodiments herein described generally relate to an electronic device, a method, and a computer program product.

BACKGROUND

Real-time voice processing by a cloud service (such as a personal assistant using a natural language user interface (UI), Speech Interpretation and Recognition Interface (Siri) (registered trademark), and Google Now (registered trademark)) is now being put into practical use. With this trend, generally, an electronic device side owned by a user is mainly used as a sound-collecting microphone collecting sounds around the electronic device and as a notification/display device for feedback from a cloud server, whereas the cloud server side is used as a device performing high-load processing such as processing on sounds collected by the electronic device.

It is likely to estimate that the above-described real-time processing performed by a cloud service be similarly applied to images. For example, such real-time processing performed by a cloud service has been studied that uses an electronic device such as an augmented reality (AR) glass including Google Glass (registered trademark) and an imaging device that images the sight of a user wearing the electronic device.

Applying real-time processing on sounds to real-time processing on an image imaged by the imaging device, however, may cause difficulties in feeding back a processing result on the image obtained at the cloud server side onto the sight of a user wearing the electronic device on a real-time basis.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to an embodiment, generally, an electronic device in which user can see through at least a transparent part of a first display area when the electronic device is worn on a body of the user. The electronic device includes: a camera configured to image a sight of a user wearing the electronic device when the user wears the electronic device on a part of the body; a processor configured to transmit a first part included in a first position on an image imaged by the camera and first information regarding the first part and receive second information relating to processing result on the first part after a first term has passed since transmission of the first information; and display circuitry configured to display the second information at a third position on the first display area, the third position determined according to a second position in the first part on an image imaged by the camera after the first term has passed since transmission of the first information.

An operation support terminal in which an electronic device, a method, and a computer program product according to the embodiment are employed will now be described with reference to accompanying drawings.

Figure 1:
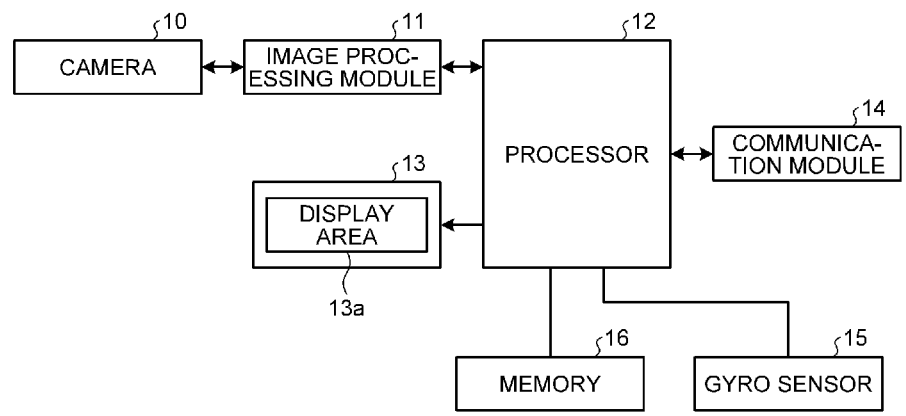
FIG. 1 is a drawing that illustrates an example of the hardware configuration of an operation support terminal according to a first embodiment.

FIG. 1 is a drawing that illustrates an example of the hardware configuration of an operation support terminal according to a first embodiment. The operation support terminal (an example of an electronic device) is a wearable device that secures at least the sight of a user in the direction passing through a display area 13a that will be described later with permeability when the user wears the operation support terminal on a part of his/her body. The operation support terminal in this embodiment is a glass-type wearable device wearable on the head of a user. In specific, the operation support terminal includes, as FIG. 1 illustrates, a camera 10, an image processing module 11, a processor 12, a display 13, a communication module 14, a gyro sensor 15, and a memory 16.

The camera 10 is an example of an imaging device capable of imaging the sight of a user wearing the operation support terminal. The camera 10 in this embodiment is capable of imaging views in front of the operation support terminal. The image processing module 11 executes image processing on a dynamic image imaged by the camera 10. The processor 12 is configured with a central processing unit (CPU) and others and controls the modules included in the operation support terminal. In this embodiment, the image processing module 11 and the processor 12 are implemented by different processors from each other. This configuration is, however, not limiting, and the image processing module 11 and the processor 12 may be implemented by a processor mounted on electronic circuitry. Examples of the display 13 include an augmented reality (AR) glass. The display 13 includes the display area 13a (in this embodiment, a lens of a glass-type wearable device) for displaying various kinds of information on the sight of a user wearing the operation support terminal. The display area 13a is permeable and is capable of securing the sight of a user in the direction passing through the display area 13a when various kinds of information are displayed. The communication module 14 communicates with a cloud server via a network such as the Internet. The gyro sensor 15 is an example of a sensor for detecting changes on the sight of a user wearing the operation support terminal. The memory 16 is capable of storing therein various kinds of information such as a program executed by the image processing module 11 and the processor 12.

Figure 2:
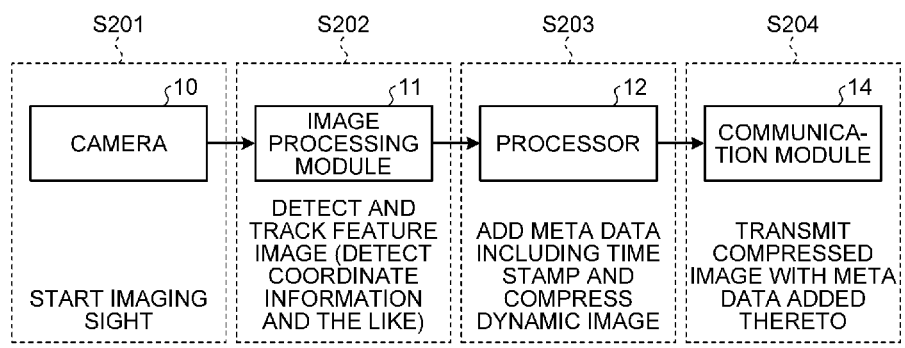
FIG. 2 is a drawing for describing an example of transmission processing performed by the operation support terminal according to the first embodiment in transmitting a dynamic image to a cloud server.

Transmission processing performed by the operation support terminal according to this embodiment in transmitting dynamic images to a cloud server will now be described with reference to FIG. 2. FIG. 2 is a drawing for describing an example of transmission processing performed by the operation support terminal according to the first embodiment in transmitting dynamic images to a cloud server. In this embodiment, the transmission processing for transmitting dynamic images to a cloud server is performed with the image processing module 11 and the processor 12 executing a program stored in the memory 16.

In this embodiment, when the operation support terminal is put on apart of the body of a user and the power source of the operation support terminal is turned on, the processor 12 controls the camera 10 and starts imaging the sight of the user wearing the operation support terminal (S201). Examples of the image processing module 11 include an image recognition processor Visconti 2 (registered trademark). The image processing module 11 detects a feature image (an example of a first part) of an object (such as a moving object, a human face, a registration number of a vehicle) included in a dynamic image (an example of an image) imaged by the camera 10 and tracks (follows) the detected feature image (S202).

In specific, the image processing module 11 detects a feature image included in a dynamic image imaged by the camera 10 by use of Co-occurrence Histogram of Oriented Gradients (CoHOG) and the like. The image processing module 11 repeats detection of information (in this embodiment, coordinate information indicating coordinates of the feature image in the dynamic image) relating to the position (an example of a first position) of the detected feature image in the dynamic image by use of the particle filter and the like. The image processing module 11 stores information (hereinafter referred to as "meta data") of each feature image, which includes detected coordinate information, a time stamp indicating the date and time when the feature image is included in the dynamic image, a serial number serving as a number for distinguishing the feature image from others, and the kind of an object serving as a photographic subject of the feature image, in the memory 16, thereby tracking the feature image in the dynamic image. In this embodiment, the image processing module 11 stores meta data of the feature image in the memory 16 until the feature image moves out of the frame of the dynamic image (in other words, until the feature image is excluded from the dynamic image).

The processor 12 compresses the dynamic image imaged by the camera 10 (S203). The processor 12 adds meta data (an example of first information) of the feature image to the compressed dynamic image (hereinafter referred to as a "compressed image") as information used for distinguishing the feature image in the dynamic image (S203).

In this embodiment, the processor 12 adds meta data including coordinate information, a time stamp, a serial number, and the kind of a feature image to a dynamic image as information used for distinguishing the feature image. Any configurations, however, are applicable without being limited to this configuration as long as information to be added to a dynamic image as meta data is effective in distinguishing between feature images when a plurality of feature images are included in the dynamic image. For example, if feature images included in the dynamic image are feature images of objects in different kinds from one another, the processor 12 may add meta data including only the kind of the object serving as a photographic subject of the feature image to the dynamic image.

The processor 12 transmits the compressed image with meta data added thereto to a cloud server through the communication module 14 (S204). In this embodiment, the processor 12 transmits a compressed image made by compressing a dynamic image imaged by the camera 10 to a cloud server. Any manners are, however, applicable without being limited to this manner as long as a dynamic image imaged by the camera 10 can be transmitted to the cloud server. For example, if a wide data transmission bandwidth is available to transmit a dynamic image to the cloud server, the processor 12 may transmit the dynamic image imaged by the camera 10 to the cloud server without compressing the dynamic image. Furthermore, in this embodiment, the processor 12 adds meta data to a compressed image and transmits the data to the cloud server. Any processes are, however, applicable without being limited to this process as long as a compressed image and meta data can be transmitted to the cloud server. For example, a compressed image and meta data may be separately transmitted. Furthermore, in this embodiment, the processor 12 incorporated in the operation support terminal transmits a compressed image and meta data to the cloud server; however, instead of the processor 12 incorporated in the operation support terminal, a processor provided to an external device (such as a smartphone capable of communicating with the operation support terminal) may transmit a compressed image and meta data to the cloud server.

The following describes processing performed by the cloud server receiving a compressed image from the operation support terminal. The cloud server receives a compressed image transmitted from the operation support terminal. The cloud server then acquires a dynamic image by decompressing the received compressed image. The cloud server thereafter executes predetermined processing on a feature image included in the acquired dynamic image by use of meta data added to the received compressed image. In specific, the cloud server selects a frame for detecting the feature image out of a plurality of frames configuring the acquired dynamic image based on the date and time indicated by a time stamp included in the meta data. And the cloud server detects the feature image from the selected frame by use of coordinate information, a serial number, and the kind of the feature image, which are included in the meta data.

The cloud server furthermore executes predetermined processing on the detected feature image. In this embodiment, the cloud server executes matching processing for determining whether the detected feature image matches any of images (such as a photograph of the face of a wanted person and the registration number of a stolen car) preliminarily stored in the database of the cloud server.

The cloud server adds meta data (in this embodiment, meta data including a time stamp, a serial number, and the kind of a feature image) for distinguishing a feature image that has undergone the processing to a result of the processing that has been performed on the detected feature image and transmits the result to the operation support terminal. In this embodiment, only when the cloud server determines that a feature image detected from the dynamic image matches one of images preliminarily stored in the database, the cloud server transmits a processing result indicating that a feature image detected from the dynamic image matches an image preliminarily stored in the database to the operation support terminal. For example, when a feature image detected from the dynamic image matches one of images preliminarily stored in the database, the cloud server transmits information notifying that the person is a wanted criminal, the details of the crime committed by the wanted criminal, the number of a stolen car, the model of the stolen car, the color of the stolen car, and the like to the operation support terminal as a processing result.

Figure 3:
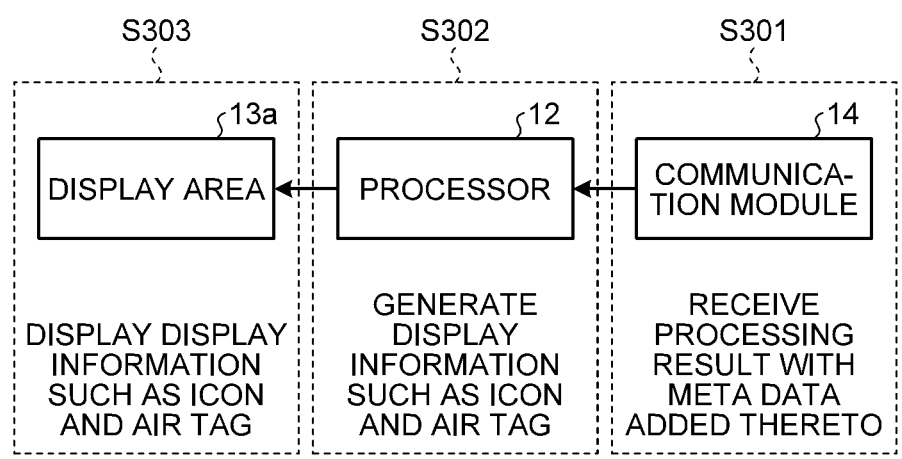
FIG. 3 is a drawing for describing an example of display processing of processing results performed by the operation support terminal according to the first embodiment.

Display processing on a processing result performed by the operation support terminal according to this embodiment will now be described with reference to FIG. 3. FIG. 3 is a drawing for describing an example of display processing on a processing result performed by the operation support terminal according to the first embodiment. In this embodiment, the image processing module 11 and the processor 12 execute a program stored in the memory 16, thereby performing the display processing on a processing result.

In this embodiment, the processor 12 controls the communication module 14 while the camera 10 is imaging an object and receives a processing result from the cloud server after a first term has passed since transmission of meta data (S301). In this embodiment, the processor 12 receives a processing result (an example of second information) with meta data added thereto from the cloud server. Any manners are, however, applicable without being limited to this manner as long as the processor 12 can receive, from the cloud server, a processing result and meta data of a feature image on which the processing result has been obtained in an associated manner with each other. Furthermore, in this embodiment, the processor 12 receives a processing result of predetermined processing performed on a feature image. Any processes are, however, applicable without being limited to this process as long as the processor 12 can receive information relating to a processing result of predetermined processing performed on a feature image. For example, the processor 12 may receive information (such as an image that has been used in matching processing, which is an example of predetermined processing) that has been used in predetermined processing performed on the feature image as information relating to a processing result of the predetermined processing performed on the feature image. Furthermore, in this embodiment, the processor 12 incorporated in the operation support terminal receives a processing result from the cloud server; however, instead of the processor 12 incorporated in the operation support terminal, a processor provided to an external device (such as a smartphone capable of communicating with the operation support terminal) may receive the processing result from the cloud server. When the processor 12 receives the processing result from the cloud server, the processor 12 generates display information (such as an icon and an air tag indicating the processing result), which is an example of second information relating to the processing result, by use of the received processing result (S302). For example, when the processor 12 receives a processing result indicating that the feature image detected from the dynamic image matches an image preliminarily stored in the database of the cloud server, the processor 12 generates display information indicating that the feature image detected from the dynamic image matches an image preliminarily stored in the database of the cloud server.

The processor 12 (an example of display circuitry) displays display information at a position (an example of a third position) on the display area 13a, the position being defined according to the position (an example of a second position) of the feature image in the dynamic image imaged by the camera 10 after the first term has passed since transmission of meta data (S303). In specific, the processor 12 specifies a feature image having meta data (meta data associated with the received processing result) added to the received processing result out of feature images being tracked in the dynamic image imaged by the camera 10. The processor 12 displays display information at a position in the display area 13a, the position at which the user captures the object serving as a photographic subject of the specified feature image in his/her sight (S303). Accordingly, even if the object serving as a photographic subject of the feature image moves in the sight of the user wearing the operation support terminal during the delay time from transmission of the dynamic image to the cloud server until receipt of the processing result, the processing result transmitted from the cloud server can be displayed at a position in the display area 13a, the position at which the user captures the object serving as a photographic subject of the feature image on which the processing result has been obtained in his/her sight (which means that the processing result on the feature image can be displayed in a manner of following the move of the object serving as a photographed subject of the feature image). With this configuration, the processing result on the feature image can be fed back from the cloud server in real time.

In this embodiment, the processor 12 displays display information at a position in the display area 13a, the position at which the user captures, in his/her sight, the object serving as a photographic subject of the feature image having meta data added to the received processing result. This configuration is, however, not limiting. For example, the processor 12 may display generated display information in the vicinity of a position in the display area 13a, the position at which the user captures, in his/her sight, the object serving as a photographic subject of the feature image having meta data added to the received processing result.

The operation support terminal according to the first embodiment can receive a real-time feedback about a processing result on a feature image from the cloud server when tracking the feature image included in a dynamic image and displaying the processing result of processing performed on the feature image by the cloud server on the display area 13a.

A second embodiment is an example of the case where the database of the cloud server stores therein a photograph of the face of a dangerous person, a terrorist, or the like as an image for matching to a feature image transmitted from the operation support terminal. Description overlapping with the first embodiment will be omitted in the following description.

In this embodiment, the image processing module 11 of the operation support terminal detects an image of a human such as a human face and figure included in a dynamic image imaged by the camera 10 as a feature image and tracks the detected feature image.

In this embodiment, the cloud server has a database preliminarily storing therein images of photographs of faces of a dangerous person and a terrorist and their figures. When the cloud server acquires a dynamic image by decompressing a compressed image transmitted from the operation support terminal, the cloud server executes predetermined processing on a feature image included in the acquired dynamic image by use of meta data added to the compressed image in a similar manner with the first embodiment.

In specific, the cloud server selects a frame for detecting the feature image out of a plurality of frames configuring the acquired dynamic image based on the date and time indicated by a time stamp included in the meta data. The cloud server thereafter detects the feature image from the selected frame by use of coordinate information, a serial number, and the kind of an object serving as a photographic subject of the feature image, which are included in the meta data.

The cloud server furthermore executes predetermined processing on the detected feature image. In this embodiment, the cloud server executes matching processing for determining whether the detected feature image matches one of images (such as photographs of faces of a dangerous person and a terrorist and their figures) preliminarily stored in the database of the cloud server.

The cloud server adds meta data (in this embodiment, meta data including a time stamp, a serial number, and the kind of a feature image) for distinguishing a feature image that has undergone the processing to a processing result of the processing performed on the detected feature image and transmits the processing result to the operation support terminal. In this embodiment, the cloud server transmits a processing result indicating that a feature image detected from the dynamic image matches an image preliminarily stored in the database to the operation support terminal only when the cloud server determines that a feature image detected from the dynamic image matches one of images preliminarily stored in the database.

The processor 12 of the operation support terminal specifies, in the same manner as the first embodiment, a feature image having meta data added to a processing result transmitted from the cloud server out of feature images being tracked in the display area 13a. The processor 12 thereafter displays display information at a position in the display area 13a, the position at which the user captures the object serving as a photographic subject of the specified feature image in his/her sight.

Consequently, the operation support terminal according to the second embodiment exerts the same effect as that of the first embodiment.

A first modification is an example of the case of extracting (cutting out) a feature image from a dynamic image obtained by imaging the sight of a user wearing the operation support terminal and transmitting the extracted feature image instead of the dynamic image to the cloud server. Description overlapping with the first embodiment will be omitted in the following description.

In this modification, the processor 12 extracts a feature image to be tracked from a dynamic image imaged by the camera 10. The processor 12 thereafter compresses the extracted feature image, adds meta data to the extracted feature image, and transmits the feature image to the cloud server. This process can reduce the amount of communication necessary for transmitting a feature image to the cloud server if the feature image extracted from the dynamic image is transmitted with the same number of pixels or the same compressibility as those in transmitting the dynamic image to the cloud server, thereby reducing the load of communication between the operation support terminal and the cloud server.

The processor 12 may transmit the feature image extracted from the dynamic image to the cloud server after increasing the number of pixels in the feature image or decreasing compressibility of the feature image. This manner improves the accuracy in determining whether the feature image matches an image preliminarily stored in the database of the cloud server.

Consequently, the operation support terminal according to the first modification exerts the effect of reducing the load of communication between the operation support terminal and the cloud server when a limited data transmission bandwidth is only available in transmitting data from the operation support terminal to the cloud server or when data is transmitted from a plurality of operation support terminals to the cloud server.

A second modification is an example of the case of displaying information making the position of an object serving as a photographic subject of a feature image distinguishable on a display area of a display when displaying display information at a position in the display area, the position at which the user captures the object serving as a photographic subject of the feature image in his/her sight. Description overlapping with the first embodiment will be omitted in the following description.

In this modification, the camera 10 is capable of imaging a first range (in this embodiment, the sides and the back of the sight of a user wearing the operation support terminal) located outside the sight of a user wearing the operation support terminal in addition to the sight of the user wearing the operation support terminal. Examples of the camera 10 include a camera with a fish-eye lens, a plurality of cameras, a camera mounted on Google car. The camera 10 is capable of imaging 360 degrees of the view around a user wearing the operation support terminal.

In this modification, the image processing module 11 detects and tracks a feature image included in a dynamic image obtained by imaging the first range with the camera 10 in addition to detecting and tracking a feature image included in a dynamic image obtained by imaging the sight of a user wearing the operation support terminal.

In this modification, if the camera 10 has a fish-eye lens and a dynamic image imaged by the camera 10 has distortion, the image processing module 11 corrects the distortion of the dynamic image imaged by the camera 10. The image processing module 11 furthermore detects and tracks a feature image included in the dynamic image with its distortion corrected.

If the camera 10 has a plurality of cameras each imaging different ranges from one another, the image processing module 11 synthesizes a dynamic image obtained by imaging 360 degrees of the view around a user wearing the operation support terminal by use of a dynamic image imaged by each of the cameras. The image processing module 11 detects and tracks a feature image included in the synthesized dynamic image.

In this modification, the processor 12 adds meta data of a feature image included in a dynamic image obtained by imaging the first range to the dynamic image and transmits the dynamic image together with a dynamic image obtained by imaging the sight of a user wearing the operation support terminal to the cloud server.

The cloud server executes predetermined processing on the feature image included in the dynamic image obtained by imaging the sight of the user wearing the operation support terminal and also on the feature image included in the dynamic image obtained by imaging the first range. The cloud server thereafter transmits a processing result on the feature image included in the dynamic image obtained by imaging the sight of the user wearing the operation support terminal and a processing result on the feature image included in the dynamic image obtained by imaging the first range to the operation support terminal.

In this modification, if the gyro sensor 15 detects no changes on the sight of a user wearing the operation support terminal and a dynamic image obtained by imaging the first range with the camera 10 includes therein a feature image (in other words, if the feature image included in the dynamic image obtained by imaging the first range is being tracked), the processor 12 displays positional information, on the display area 13a, which is information having the sight of a user wearing the operation support terminal as a standard and making the position of an object serving as a photographic subject of the feature image distinguishable. This process notifies the user that an object exists outside his/her sight and urges the user to direct his/her sight toward the position of the object existing outside the sight, which accordingly makes it possible to display a processing result on a feature image of an object existing in a wider range. For example, the processor 12 displays an arrow at the end of a position side in the display area 13a, the position side where the object of the feature image exists with the sight of the user wearing the operation support terminal as a standard. In this embodiment, if the gyro sensor 15 detects no changes on the sight of the user wearing the operation support terminal, the processor 12 displays positional information on the display area 13a. Any configurations are, however, applicable without being limited to this configuration as long as positional information is displayed on the display area 13a in displaying display information on the display area 13a. For example, the processor 12 may keep positional information together with display information constantly displayed on the display area 13a in displaying display information on the display area 13a. Furthermore, in this embodiment, the processor 12 displays, on the display area 13a, positional information of an object serving as a photographic subject of a feature image included in a dynamic image obtained by imaging the first range with the camera 10. Any configurations are, however, applicable without being limited to this configuration as long as positional information of a photographic subject of a feature image included in a dynamic image imaged by the camera 10 is displayed on the display area 13a. For example, in such a case where a feature image is included in a dynamic image obtained by imaging a range other than the first range with the camera 10, the processor 12 may also display positional information on the photographic subject of the feature image on the display area 13a.

When the gyro sensor 15 detects the state where the sight of a user wearing the operation support terminal has changed to the first range, the processor 12 displays display information at a position (an example of the third position) on the display area 13a, the position being defined according to the position (an example of the second position) of a feature image included in a dynamic image obtained by imaging the first range with the camera 10 after the first term has passed since transmission of meta data. In specific, when the gyro sensor 15 detects the state where the sight of a user wearing the operation support terminal has changed to the first range, the processor 12 specifies a feature image having meta data added to the received processing result out of feature images being tracked in the dynamic image obtained by imaging the first range with the camera 10. The processor 12 thereafter displays display information at a position in the display area 13a, the position at which the user captures the object serving as a photographic subject of the specified feature image in his/her sight. With this process, when a user wearing the operation support terminal changes his/her sight, the processing result on a feature image of an object existing in the changed sight can be immediately displayed. Consequently, a processing result on a feature image existing in a wider range can be displayed on a real-time basis.

The operation support terminal according to the second modification can display a processing result on a feature image existing in a wider range.

A third modification is an example of the case where, when a feature image moves outside the frame of a dynamic image (hereinafter referred to as "out of the frame"), the direction in which the feature image has moved out of the frame of the dynamic image and the feature image that has moved out of the frame of the dynamic image are displayed on the display area of a display for a predetermined time after the feature image has moved out of the frame of the dynamic image. Description overlapping with the first embodiment will be omitted in the following description.

In this modification, when a feature image moves out of the frame of the dynamic image, the processor 12 extracts the feature image from the dynamic image before the feature image has moved out of the frame and stores the extracted feature image in the memory 16 for a predetermined time. The processor 12 also keeps meta data of the feature image that has moved out of the frame of the dynamic image stored in the memory 16 for a predetermined time after the feature image has moved out of the frame. With this process, when the feature image that has moved out of the frame of the dynamic image is again included in the frame of the dynamic image (hereinafter referred to as "into the frame") within a predetermined time, the processor 12 can display a processing result (display information) on the feature image that has moved into the frame at a position (in this embodiment, a position in the display area 13a where the user captures the object serving as a photographic subject of the feature image that has moved into the frame in his/her sight) on the display area 13a, the position defined according to the position of the feature image that has moved into the frame of the dynamic image imaged by the camera 10, by use of meta data of the feature image that has moved into the frame.

The processor 12 displays the direction in which the feature image has moved out of the frame and the feature image (the feature image stored in the memory 16) that has moved out of the frame on the display area 13a for a predetermined time after the feature image has moved out of the frame of the dynamic image. With this process, if the object serving as a photographic subject of the feature image that has moved out of the frame of the dynamic image exists near the sight of a user wearing the operation support terminal, the object serving as a photographic subject of the feature image that has moved out of the frame can be soon again caught in the sight of the user, which facilitates search of the object serving as a photographic subject of the feature image that has moved out of the frame of the dynamic image. In this modification, the processor 12 displays the direction in which the feature image has moved out of the frame and the feature image that has moved out of the frame on the display area 13a. Any configurations are, however, applicable without being limited to this configuration as long as such information is displayed that makes the direction in which an object serving as a photographic subject of a feature image exists visually distinguishable. For example, in this modification, the processor 12 may display only the direction in which a feature image has moved out of the frame on the display area 13a. Furthermore, in this modification, when a feature image has moved out of the frame of a dynamic image, such information is displayed on the display area 13a that makes the direction in which the object serving as a photographic subject of the feature image exists distinguishable regardless of whether the first term has passed since transmission of meta data of the feature image. However, the information may be displayed on the display area 13a that makes the direction in which the object serving as a photographic subject of the feature image exists distinguishable only when the photographic subject of the feature image exists outside the sight of the user (in other words, only when the feature image has moved out of the frame of the dynamic image) after the first term has passed since transmission of meta data of the feature image.

In this modification, the processor 12 displays a feature image stored in the memory 16 on the display area 13a. Any configurations are, however, applicable without being limited to this configuration. For example, a feature image included in a dynamic image that has been transmitted to the cloud server may be acquired from the cloud server and displayed on the display area 13a.

Consequently, the operation support terminal according to the third modification exerts advantageous effects in searching an object serving as a photographic subject of a feature image that has moved out of the frame of a dynamic image obtained by imaging the sight of a user wearing the operation support terminal.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An augmented reality (AR) glass in which a user can see through at least a transparent part of a first display area when the AR glass is worn on a body of the user, the AR glass comprising:
a camera configured to image a sight of a user wearing the AR glass when the user wears the AR glass on a part of the body;
a processor configured to:
transmit all first parts included in first positions on an image imaged by the camera and first information regarding the first parts to a cloud server, the first part being a part like a face of a person or registration number of a car existing within the sight of the user, the first information being information which includes a position of each of the first parts in the image, a date and time when each of the first parts is included in the image, and a number which is a unique ID that indicates each of the first parts of the image;
receive second information relating to a processing result on the first parts from the cloud server after a first term has passed since transmission of the first information, the second information being information adding the number that indicates each of the processed first parts, and the processing result being a processing result of matching processing executed by the cloud server for determining whether each of the first parts matches a photograph of a face of a wanted person or registration number of a stolen car preliminarily stored in a database of the cloud server; and
track the first parts in the image; and
display circuitry configured to display the second information at a third position on the first display area, the third position determined according to second positions of the first parts based on the numbers added to the received second information out of the first parts being tracked in an image imaged by the camera after the first term has passed since transmission of the first information.

2. The AR glass of claim 1, wherein
the camera images a first range located outside the sight of the user, and
the display circuitry displays information making a position of a photographic subject in the first range distinguishable on the first display area upon displaying the second information at the third position.

3. The AR glass of claim 1, wherein the display circuitry makes a direction in which a photographic subject of each of the first parts exists visually distinguishable when the photographic subject of each of the first parts is located outside the sight of the user after the first term has passed since the transmission of the first information.

4. The AR glass of claim 1, wherein the processor cuts out a feature image from the image and transmits the feature image as the first parts.

5. A method executed by an AR glass in which a user can see through at least a transparent part of a first display area when the AR glass is worn on a body of the user, the method comprising:
imaging a sight of a user wearing the AR glass when the user wears the AR glass on a part of the body;
transmitting all first parts included in first positions on an image captured by imaging and first information regarding the first parts to a cloud server, the first part being a part like a face of a person or registration number of a car existing within the sight of the user, the first information being information which includes a position of each of the first parts in the image, a date and time when each of the first parts is included in the image, and a number which is a unique ID that indicates each of the first parts of the image;
receiving second information relating to a processing result on the first parts from the cloud server after a first term has passed since transmission of the first information, the second information being information adding the number that indicates each of the processed first parts, and the processing result being a processing result of matching processing executed by the cloud server for determining whether each of the first parts matches a photograph of a face of a wanted person or registration number of a stolen car preliminarily stored in a database of the cloud server;
tracking the first part in the image; and
displaying the second information at a third position on the first display area, the third position determined according to second of the first parts based on the numbers added to the received second information out of the first parts being tracked in an image captured by imaging after the first term has passed since transmission of the first information.

6. The method of claim 5, wherein
the imaging includes imaging a first range located outside the sight of the user, and
a position corresponding to a photographic subject in the first range of the image is distinguishable on the first display area upon displaying the second information at the third position.

7. The method of claim 5, wherein a direction in which a photographic subject of each of the first parts exists is visually distinguishable when the photographic subject of each of the first parts is located outside the sight of the user after the first term has passed since the transmission of the first information.

8. The method of claim 5, wherein the transmitting includes to transmit a feature image cut out from the image as the first parts.

9. A computer program product having a non-transitory computer readable medium including programmed instructions, wherein the instructions, when executed by a computer, cause the computer to perform:
- imaging a sight of a user wearing an AR glass when the user wears the AR glass on a part of the body, the AR glass in which the user can see through at least a transparent part of a first display area when the AR glass is worn on the body of the user;
- transmitting all first parts included in first positions on an image captured by imaging and first information regarding the first parts to a cloud server, the first part being a part like a face of a person or registration number of a car existing within the sight of the user, the first information being information which includes a position of each of the first parts in the image, a date and time when each of the first parts is included in the image, and a number which is a unique ID that indicates each of the first parts of the image;
- receiving second information relating to a processing result on the first parts from the cloud server after a first term has passed since transmission of the first information, the second information being information adding the number that indicates each of the processed first parts, and the processing result being a processing result of matching processing executed by the cloud server for determining whether each of the first parts matches a photograph of a face of a wanted person or registration number of a stolen car preliminarily stored in a database of the cloud server;
- tracking the first parts in the image; and
- displaying the second information at a third position on the first display area, the third position determined according to second positions of the first parts based on the numbers added to the received second information out of the first parts being tracked in an image captured by imaging after the first term has passed since transmission of the first information.

10. The computer program product of claim 9, wherein
- the imaging includes imaging a first range located outside the sight of the user, and
- a position corresponding to a photographic subject in the first range of the image is distinguishable on the first display area upon displaying the second information at the third position.

11. The computer program product of claim 9, wherein a direction in which a photographic subject of each of the first parts exists is visually distinguishable when the photographic subject of each of the first parts is located outside the sight of the user after the first term has passed since the transmission of the first information.

12. The computer program product of claim 9, wherein the transmitting includes to transmit a feature image cut out from the image as the first parts.

* * * * *